United States Patent
Wen (10) Patent No.: US 11,869,167 B2
(45) Date of Patent: Jan. 9, 2024

(54) METHOD FOR TRANSMITTING REDUCED DEPTH INFORMATION AND ELECTRONIC DEVICE

(71) Applicant: HTC Corporation, Taoyuan (TW)

(72) Inventor: Yu-You Wen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 395 days.

(21) Appl. No.: 17/373,799

(22) Filed: Jul. 13, 2021

(65) Prior Publication Data

US 2022/0020112 A1 Jan. 20, 2022

Related U.S. Application Data (60) Provisional application No. 63/051,386, filed on Jul. 14, 2020.

(51) Int. Cl.
*G06T 7/40* (2017.01)
*G06T 3/40* (2006.01)
(Continued)

(52) U.S. Cl.
CPC .................. *G06T 3/40* (2013.01); *G06T 5/50* (2013.01); *G06T 9/00* (2013.01); *H04L 65/70* (2022.05);
(Continued)

(58) Field of Classification Search
CPC .... G06T 3/40; G06T 5/50; G06T 9/00; G06T 2207/10028; G06T 2207/20021;
(Continued)

(56) References Cited

U.S. PATENT DOCUMENTS

| 2010/0239187 A1 | 9/2010 | Yea et al. |
| 2011/0069152 A1 | 3/2011 | Wang et al. |

(Continued)

FOREIGN PATENT DOCUMENTS

| CN | 102203829 | 9/2011 |
| CN | 103250184 | 8/2013 |

(Continued)

OTHER PUBLICATIONS

Jianjun Song et al., "Down-/Up-Sampling Based Depth Coding by Utilizing Interview Correlation", 2015 IEEE 17th International Workshop on Multimedia Signal Processing (MMSP), Oct. 21, 2015, pp. 1-5.

*Primary Examiner* — Mekonen T Bekele
(74) *Attorney, Agent, or Firm* — JCIPRNET (57) ABSTRACT

The embodiments of the disclosure provide a method for transmitting reduced depth information and an electronic device. The method includes: obtaining a first depth map of an image frame, wherein the first depth map includes a plurality of first depth pixels corresponding to multiple image pixels in the image frame; downscaling the first depth map as a second depth map, wherein the second depth map includes multiple second depth pixels, and each second depth pixel has a depth value; adjusting the second depth map as a third depth map by scaling up the depth value of each second depth pixel based on a specific ratio; dividing the third depth map into multiple fourth depth maps; appending the fourth depth maps to the image frame; encoding the image frame appended with the fourth depth maps; and transmitting the encoded image frame to a client device.

20 Claims, 6 Drawing Sheets

(51) Int. Cl.
*G06T 9/00* (2006.01)
*G06T 5/50* (2006.01)
*H04L 67/10* (2022.01)
*H04L 65/70* (2022.01)
*H04L 65/75* (2022.01)

(52) U.S. Cl.
CPC .............. *H04L 65/75* (2022.05); *H04L 67/10* (2013.01); *G06T 2207/10028* (2013.01); *G06T 2207/20021* (2013.01)

(58) Field of Classification Search
CPC ......... H04L 65/70; H04L 65/75; H04L 65/10; H04L 65/762; H04L 65/61; H04N 13/128; H04N 13/194; H04N 13/344; H04N 21/816; H04N 2213/005
See application file for complete search history.

(56) References Cited

U.S. PATENT DOCUMENTS

| | | |
|---|---|---|
| 2014/0160239 A1 | 6/2014 | Tian |
| 2015/0023586 A1 | 1/2015 | Barone |
| 2019/0141339 A1 | 5/2019 | Madajczak et al. |

FOREIGN PATENT DOCUMENTS

| | | | | |
|---|---|---|---|---|
| CN | 103546736 | | 1/2014 | |
| CN | 103810685 | | 5/2014 | |
| CN | 106355552 A | * | 1/2017 | ........... G06T 3/4053 |
| CN | 106412552 | | 2/2017 | |
| CN | 108432244 | | 8/2018 | |
| CN | 109803138 | | 5/2019 | |
| JP | 2013005289 | | 1/2013 | |
| KR | 20130123240 | | 11/2013 | |
| WO | 2018127629 | | 7/2018 | |

* cited by examiner

METHOD FOR TRANSMITTING REDUCED DEPTH INFORMATION AND ELECTRONIC DEVICE

CROSS REFERENCE TO RELATED APPLICATION

This application claims the priority benefit of U.S. provisional application Ser. No. 63/051,386, filed on Jul. 14, 2020. The entirety of the above-mentioned patent application is hereby incorporated by reference herein and made a part of specification.

BACKGROUND OF THE INVENTION

1. Field of the Invention

The present invention generally relates to a depth information transmitting mechanism, in particular, to a method for transmitting reduced depth information and an electronic device.

2. Description of Related Art

Remote virtual reality (VR) solution provides a solution to allow low end VR device to experience satisfying quality VR content by streaming from remote powerful graphics server, such as playing SteamVR content on a mobile VR device. In this solution, the latency is critical, and hence the client device relies on reprojection algorithm to shorten the reaction time for better user experience. In general, reprojection could have better result if there is depth data. However, since the bandwidth of video streaming is limited, transmitting depth data will increase the burden of bandwidth.

SUMMARY OF THE INVENTION

Accordingly, the disclosure is directed to a method for transmitting reduced depth information and an electronic device, which may be used to solve the above technical problem.

The embodiments of the disclosure provide a method for transmitting reduced depth information, including: obtaining, by a remote server, a first depth map of an image frame, wherein the first depth map includes a plurality of first depth pixels corresponding to a plurality of image pixels in the image frame; downscaling, by the remote server, the first depth map as a second depth map, wherein the second depth map includes a plurality of second depth pixels, and each second depth pixel has a depth value; adjusting, by the remote server, the second depth map as a third depth map by scaling up the depth value of each second depth pixel based on a specific ratio; dividing, by the remote server, the third depth map into a plurality of fourth depth maps; appending, by the remote server, the fourth depth maps to the image frame; encoding, by the remote server, the image frame appended with the fourth depth maps; and transmitting, by the remote server, the encoded image frame to a client device.

The embodiments of the disclosure provide an electronic system including a remote server and a client device, wherein the remote server is configured to perform: obtaining a first depth map of an image frame, wherein the first depth map includes a plurality of first depth pixels corresponding to a plurality of image pixels in the image frame; downscaling the first depth map as a second depth map, wherein the second depth map includes a plurality of second depth pixels, and each second depth pixel has a depth value; adjusting the second depth map as a third depth map by scaling up the depth value of each second depth pixel based on a specific ratio; dividing the third depth map into a plurality of fourth depth maps; appending the fourth depth maps to the image frame; encoding the image frame appended with the fourth depth maps; and transmitting the encoded image frame to the client device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
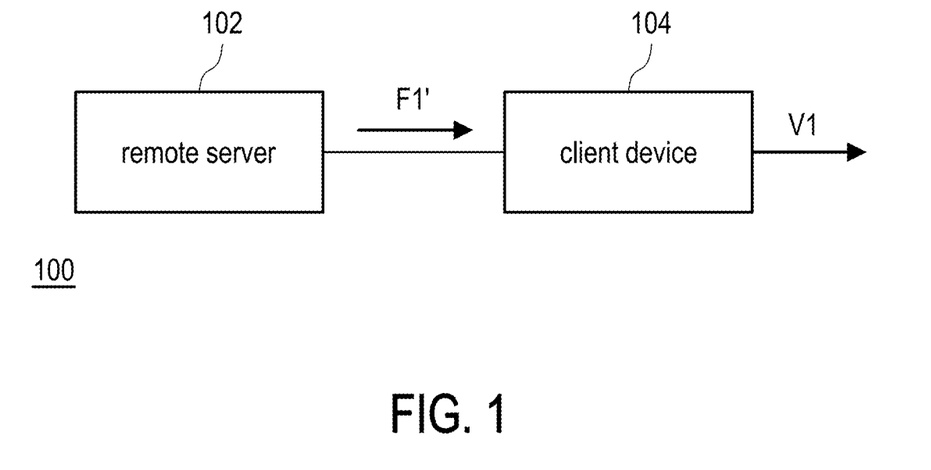
FIG. 1 is a schematic diagram of an electronic system according to an embodiment of the disclosure.

Referring to FIG. 1, which shows a schematic diagram of an electronic system according to an embodiment of the disclosure. In FIG. 1, the electronic system 100 may be a VR remote rendering system, which may include a remote server 102 and a client device 104. In various embodiments, the client device 104 may be any device that could be used to run a VR service, such as a standalone head-mounted display (HMD), a computing device (e.g., a personal computer or the like), etc., but the disclosure is not limited thereto.

In the embodiment of the disclosure, the remote server 102 connected with the client device 104 may be any device configured with high graphic processing capability, such as a computer, a server, or the like. Roughly speaking, when the client device 104 runs the VR service to provide a visual content to the user, the remote server 102 may help the client device 104 to render the image frames of the VR service and transmit the rendered image frames to the client device 104. Accordingly, the client device 104 may display/provide the rendered image frame as a visual content for the user of the client device 104.

In the embodiments of the disclosure, the remote server 102 may transmit reduced depth information along with the rendered image frame to the client device 104, such that the client device 104 may achieve better reprojection results. Detailed discussion would be provided in the following.

Figure 2:
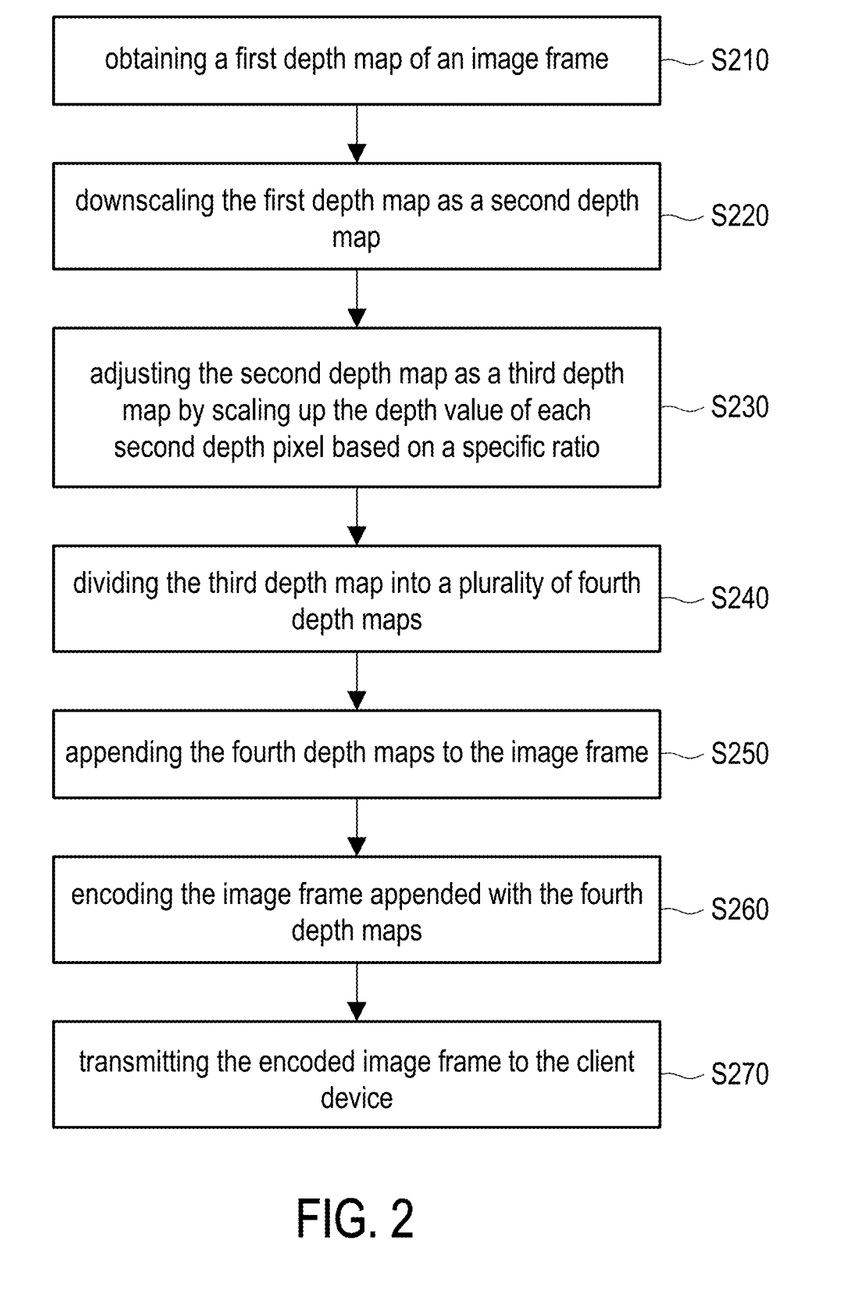
FIG. 2 is a flow chart of a method for transmitting reduced depth information according to an embodiment of the disclosure.

See FIG. 2, which shows a flow chart of a method for transmitting reduced depth information according to an embodiment of the disclosure. In the present embodiment, the method of FIG. 2 may be executed by the remote server 102 in FIG. 1, and hence the details of each step in FIG. 2 would be discussed in accompanying with the elements shown in FIG. 1, but the disclosure is not limited thereto.

In step S210, the remote server 102 obtains a first depth map of an image frame F1. In one embodiment, the remote server 102 may generate the image frame F1 for the client device 102 by rendering a specific part of a visual content, wherein the visual content is to be shown by the client device 104 for the user. In various embodiments, the specific part of the visual content may be the background part of the visual content V1, the foreground part of the visual content V1, all of the visual content V1, or any part of the visual content V1 desired by the designer, but the disclosure is not limited thereto.

In some embodiments, the image frame F1 may include a plurality of image pixels, and each image pixel may be characterized as N bits (N is a positive integer). In one embodiment, each image pixel may be characterized by 3 color channels (e.g., RGB), and each color channel may include 8 bits. In this case, each image pixel may be characterized by 24 bits (i.e., 3×8). That is, N is 24 in this case, but the disclosure is not limited thereto.

In one embodiment, the first depth map may include a plurality of first depth pixels corresponding to the image pixels in the image frame F1.

In one embodiment, the image frame F1 may include a left-eye frame part and a right-eye frame part, which respectively corresponds to the left-eye image and the right-eye image for the client device 104 to show to the user. Correspondingly, the first depth map of the image frame F1 may have a first region and a second region respectively corresponding to the left-eye frame part and the right-eye frame part of the image frame F1, but the disclosure is not limited thereto.

Next, in step S220, the remote server 102 downscale the first depth map as a second depth map, wherein the second depth map may include a plurality of second depth pixels, and each second depth pixel has a depth value.

Figure 3:
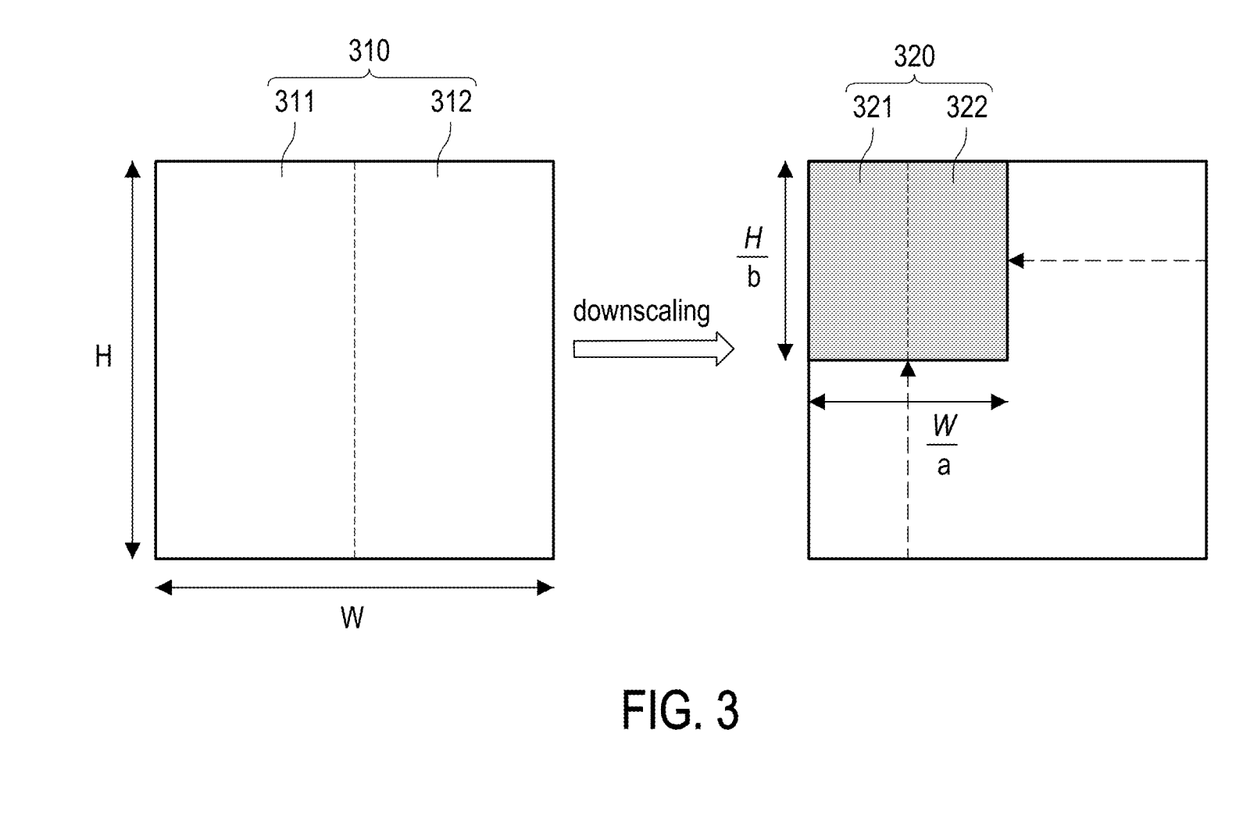
FIG. 3 is a schematic diagram illustrating downscaling the first depth map as the second depth map according to an embodiment of the disclosure.

See FIG. 3, which shows a schematic diagram illustrating downscaling the first depth map as the second depth map according to an embodiment of the disclosure. In FIG. 3, the first depth 310 may include a first region 311 and a second region 312 respectively corresponds to the left-eye frame part and the right-eye frame part in the image frame F1.

In one embodiment, the remote server 102 may downscale the first depth map 310 as the second depth map 320, wherein the second depth map 320 also includes a first region 321 and a second region 322 respectively corresponds to the left-eye frame part and the right-eye frame part in the image frame F1.

In FIG. 3, the size of the first depth map 310 may be W×H, wherein W is a width of the first depth map 310, and H is a height of the first depth map 320. In one embodiment, the remote server 102 may downscale a resolution of the first depth map 310 to $$\frac{W}{a} \times \frac{H}{b},$$

wherein a and b are scaling factors. In various embodiments, a and b may be chosen based on the requirements of the designer. In one embodiment, a and b may be assumed to be 2, which makes the size of the second depth map 320 be $$\frac{W}{2} \times \frac{H}{2},$$

but the disclosure is not limited thereto.

In one embodiment, the remote server 102 may downscale the resolution of the first depth map 310 by performing bilinear interpolation to the first depth map 310, but the disclosure is not limited thereto.

Next, in step S230, the remote server 102 adjusts the second depth map 320 as a third depth map by scaling up the depth value of each second depth pixel based on a specific ratio.

Roughly speaking, when user watches a visual content provided by the client device 104, the user would be more sensitive to the objects with low depth (i.e., near object). That is, the second depth pixels with small depth value (which may be referred to as the nearer second depth pixels) may be considered as more important/meaningful than the second depth pixels with large depth value (which may be referred to as the farther second depth pixels). Therefore, the remote server 102 may neglect the second depth pixels with large depth value (i.e., the farther second depth pixels) via step S230, such that only the depth information of the second depth pixels with small depth value will be preserved for the client device 104. Detailed discussions will be provided in the following.

In one embodiment, the depth value of each second depth pixel may be a normalized depth value ranged between a lower limit and an upper limit. In some embodiments, the lower limit may be 0.0f, and the upper limit may 1.0f (i.e., infinite depth), wherein f stands for a floating number, but the disclosure is not limited thereto.

In one embodiment, the remote server 102 may determine a reference upper limit via multiplying the upper limit with a predetermined factor, wherein the predetermined factor may range between 0 and 1. In one embodiment, assuming that the predetermined factor is 5% and the upper limit is 1.0f, the remote server 102 may determine the reference upper limit as 0.05f, but the disclosure is not limited thereto.

Next, the remote server 102 may determine the specific ratio based on the predetermined factor. In one embodiment, the specific ratio may be a reciprocal of the predetermined factor or other possible numbers larger than 1.

With the specific ratio, the remote server 102 may generate the third depth map by multiplying the depth value of each second depth pixel by the specific ratio. In this case, for those second depth pixel whose original depth value is larger than the reference upper limit, which may be regarded as the farther second depth pixels, the depth values thereof would be scaled up to be over 1.0f. That is, the depth values of the farther second depth pixels would be adjusted to be corresponding to infinite depth. From another perspective, the remote server 102 may be regarded as preserving the depth values of the nearer second depth pixels (i.e., those second depth pixel whose original depth value is smaller than the reference upper limit).

Figure 4:
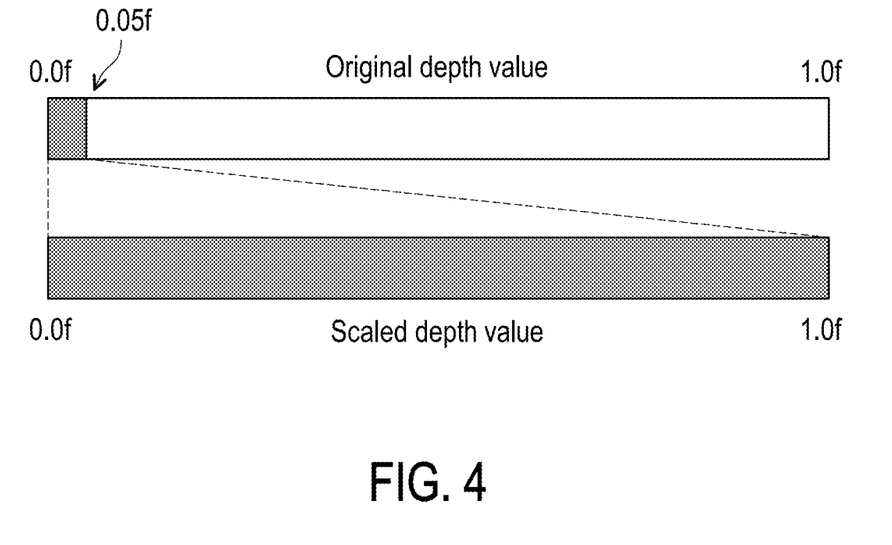
FIG. 4 is a schematic diagram illustrating scaling up the depth value according to an embodiment of the disclosure.

See FIG. 4, which shows a schematic diagram illustrating scaling up the depth value according to an embodiment of the disclosure. In FIG. 4, the remote server 102 scales up the reference upper limit (e.g., 0.05f) to be the new upper limit (i.e., 1.0f), such that only the depth values of the nearer second depth pixels would be preserved, but the disclosure is not limited thereto.

In one embodiment, the depth value of each second pixel in the third depth map may be characterized as N/2-bit depth data. In this case, the second pixels respectively corresponding to the left eye and the right eye may be combined as an N-bit data.

Figure 5:
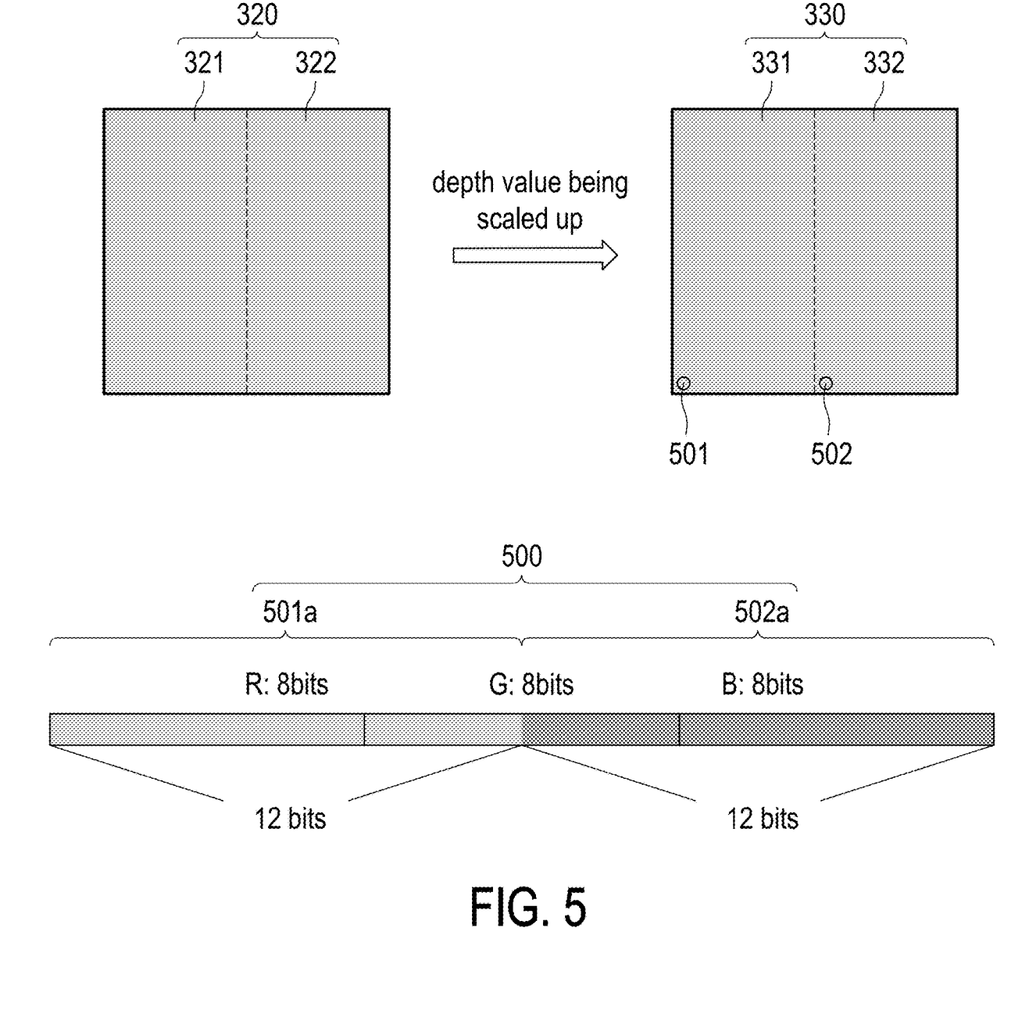
FIG. 5 is a schematic diagram illustrating combing the second pixels respectively corresponding to the left eye and the right eye according to an embodiment of the disclosure.

See FIG. 5, which shows a schematic diagram illustrating combing the second pixels respectively corresponding to the left eye and the right eye according to an embodiment of the disclosure. In FIG. 5, the remote server 102 may adjust the second depth map 320 as the third depth map 330 by scaling up the depth value of each second depth pixel in the second depth map 320 based on the above teachings. Therefore, the third depth map 330 would also include a first region 331 and a second region 332 respectively corresponds to the left-eye frame part and the right-eye frame part in the image frame F1.

In FIG. 5, assuming that the first region 331 includes a second pixel 501 corresponding to one image pixel in the left-eye frame part and the second region 332 includes a second pixel 502 corresponding to one image pixel in the right-eye frame part. In one embodiment, the relative position between the second pixel 501 and the first region 331 may be the same as the relative position between the second pixel 502 and the first region 332, but the disclosure is not limited thereto.

In one embodiment, the remote server 102 may combine the N/2-bit depth data of the second pixel 501 with the N/2-bit depth data of the second pixel 502 as a combined depth data 500.

In one embodiment, the combined depth data 500 whose size is N bits may include segments 501a and 502a, wherein the segment 501a may carry the N/2-bit (e.g., 12 bits) depth data corresponding to the depth value of the second pixel 501, and the segment 502a may carry the N/2-bit (e.g., 12 bits) depth data corresponding to the depth value of the second pixel 502.

In this case, the remote server 102 may transmit the combined depth data 500 to the client device 104 by using the same stream as the image frame F1, but the disclosure is not limited thereto.

After obtaining the third depth map 330, in step S240, the remote server 102 divides the third depth map 330 into a plurality of fourth depth maps.

In one embodiment, since the size of the second depth map 320 is $$\frac{W}{a} \times \frac{H}{b},$$

the third depth map 330 is also $$\frac{W}{a} \times \frac{H}{b}.$$

In one embodiment, the remote server 102 may uniformly divide the third depth map 330 into c portions, wherein c is a dividing factor and may be an integer. In this case, the size of each fourth depth map may be $$\frac{W}{a} \times \frac{H}{b \times c}.$$

For example, assuming that the size of the third depth map 330 is 320×240 and c is 4, the size of each fourth depth map may be determined to be 320×60, but the disclosure is not limited thereto.

Next, in step S250, the remote server 102 appends the fourth depth maps to the image frame F1.

Figure 6:
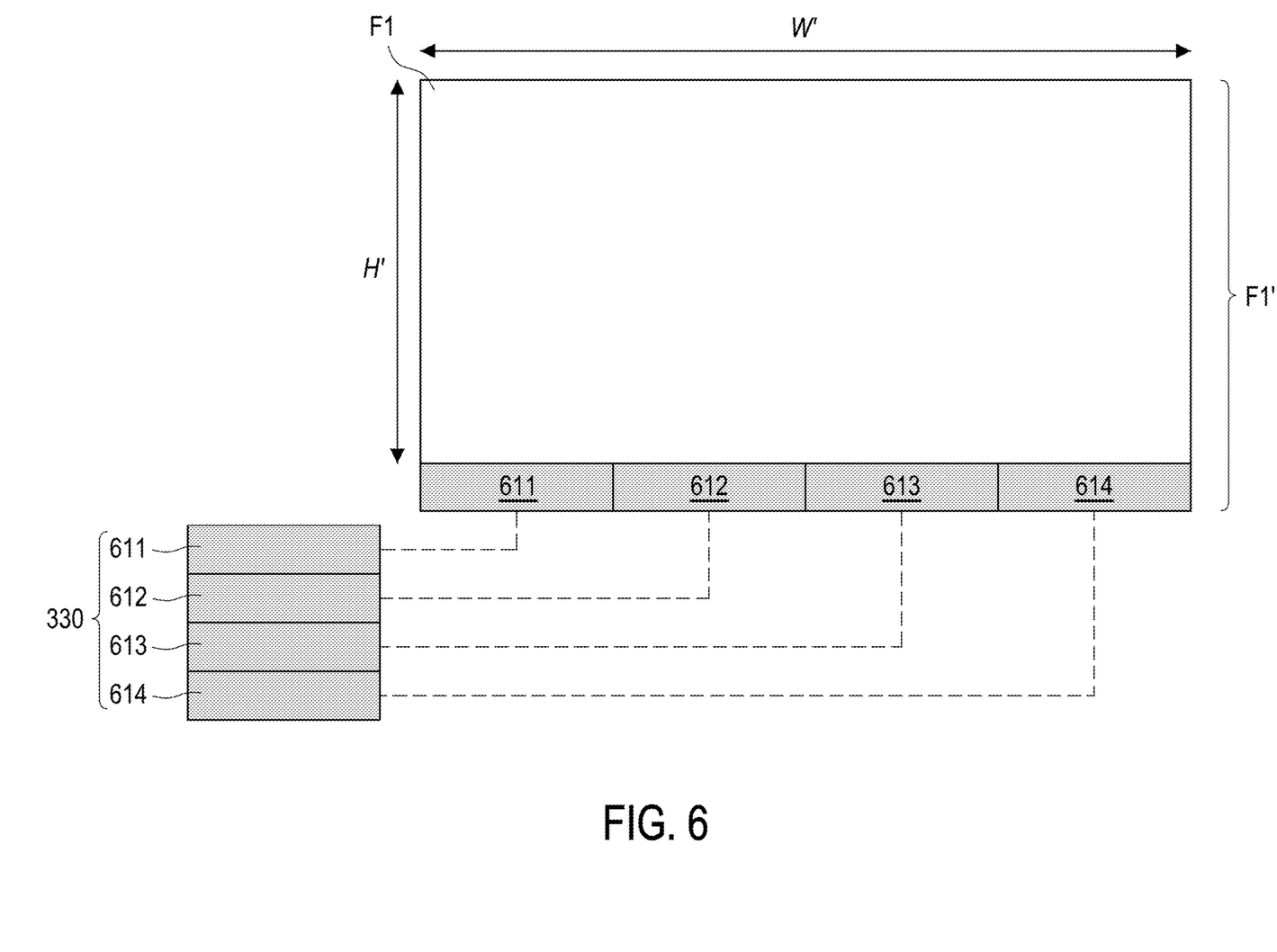
FIG. 6 is a schematic diagram illustrating appending the fourth depth maps to the image frame according to an embodiment of the disclosure.

See FIG. 6, which shows a schematic diagram illustrating appending the fourth depth maps to the image frame according to an embodiment of the disclosure. In FIG. 6, assuming that the remote server 102 uniformly divides the third depth map 330 into 4 fourth depth maps 611-614, and the size of each of the fourth depth maps 611-614 may be $$\frac{W}{a} \times \frac{H}{b \times c}.$$

In this case, the remote server 102 may append the fourth depth maps 611-614 to the image frame F1. In one embodiment, the remote server 102 may sequentially append the fourth depth maps 611-614 at the tail/bottom of the image frame F1. In FIG. 6, assuming that a size of the image frame F1 is W'×H', the size of the image frame F1 appended with the fourth depth maps 611-614 may be $$W' \times \left(H' + \frac{H}{b \times c}\right).$$

For brevity, the image frame F1 appended with the fourth depth maps 611-614 may be referred to as an image frame F1', but the disclosure is not limited thereto.

Next, in step S260, the remote server 102 encodes the image frame F1 appended with the fourth depth maps 611-614. That is, the remote server 102 may encode the image frame F1'. In various embodiments, the remote server 102 may encode the image frame F1' based on any proper encoding technologies, which would not be further discussed herein.

In step S270, the remote server 102 transmits the encoded image frame F1' to the client device 104.

Correspondingly, the client device 104 may receive the encoded image frame F1' from the remote server 102 and decode the encoded image frame F1' to obtain the image frame F1 appended with the fourth depth maps 611-614.

In one embodiment, the client device 104 may extract the fourth depth maps 611-614 from the image frame F1'. For example, since the fourth depth maps 611-614 are assumed to be appended to the tail of the image frame F1, it represents that the fourth depth maps 611-614 occupy a specific part of the image frame F1', i.e., the region collectively occupied by the fourth depth maps 611-614 in FIG. 6. In this case, the client device 104 may extract the specific part from the image frame F1' and uniformly divide the specific part into 4 (i.e., c) portions to obtain the fourth depth maps 611-614, wherein the size of each portion is $$\frac{W}{a} \times \frac{H}{b \times c}.$$

Next, the client device 104 may construct the third depth map 330 based on the fourth depth maps 611-614. For example, based on how the remote server 102 divides the third depth map 330 into the fourth depth maps 611-614 in FIG. 6, the client device 104 may sequentially stacked up the fourth depth maps 614-611 to recover the third depth map 330, but the disclosure is not limited thereto.

Afterwards, client device 104 may generate the visual content V1 based on the image frame F1 and the third depth map 330. In one embodiment, the client device 104 may perform reprojection based on the image frame F1 and the third depth map 330 to generate the visual content V1 for the user to see, but the disclosure is not limited thereto.

In summary, in the embodiments of the disclosure, since the first depth map is downscaled as the second depth map and the depth value of each second pixel in the second depth map is scaled up to generate the third depth map, the remote server may only preserve the important depth information of the nearer pixels for the client device, such that the client device may obtain better reprojection results. Accordingly, a more balanced trade-off between bandwidth and reprojection result may be achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for transmitting reduced depth information, comprising:
    obtaining, by a remote server, a first depth map of an image frame, wherein the first depth map comprises a plurality of first depth pixels corresponding to a plurality of image pixels in the image frame;
    downscaling, by the remote server, the first depth map as a second depth map, wherein the second depth map comprises a plurality of second depth pixels, and each second depth pixel has a depth value;
    adjusting, by the remote server, the second depth map as a third depth map by scaling up the depth value of each second depth pixel based on a specific ratio;
    dividing, by the remote server, the third depth map into a plurality of fourth depth maps;
    appending, by the remote server, the fourth depth maps to the image frame;
    encoding, by the remote server, the image frame appended with the fourth depth maps; and
    transmitting, by the remote server, the encoded image frame to a client device.

2. The method according to claim 1, wherein before the step of obtaining the first depth map of the image frame, the method further comprises:
    generating, by the remote server, the image frame for the client device by rendering a specific part of a visual content.

3. The method according to claim 1, wherein a size of the first depth map is W×H, W is a width of the first depth map, H is a height of the first depth map, and the step of downscaling the first depth map as the second depth map comprises:
    downscaling, by the remote server, a resolution of the first depth map to $$\frac{W}{a} \times \frac{H}{b},$$

wherein a and b are scaling factors.

4. The method according to claim 1, wherein the depth value of each second depth pixel is a normalized depth value ranged between a lower limit and an upper limit, and the step of adjusting the second depth map as the third depth map by scaling up the depth value of each second depth pixel based on the specific ratio comprises:
    determining, by the remote server, a reference upper limit via multiplying the upper limit with a predetermined factor, wherein the predetermined factor ranges between 0 and 1;
    determining, by the remote server, the specific ratio based on the predetermined factor; and
    generating, by the remote server, the third depth map by multiplying the depth value of each second depth pixel by the specific ratio.

5. The method according to claim 4, wherein the lower limit is 0.0f and the upper limit is 1.0f, wherein f stands for a floating number.

6. The method according to claim 4, wherein the specific ratio is a reciprocal of the predetermined factor.

7. The method according to claim 1, wherein the third depth map comprises a first region and a second region respectively corresponding to a left-eye frame part and a right-eye frame part of the image frame, each image pixel is characterized as N bits, and the depth value of each second pixel in the third depth map is characterized as N/2 bits.

8. The method according to claim 1, wherein a size of the third depth map is $$\frac{W}{a} \times \frac{H}{b},$$

and a size of each fourth depth map is $$\frac{W}{a} \times \frac{H}{b \times c},$$

wherein a and b are scaling factors, c is a dividing factor.

9. The method according to claim 8, wherein a size of the image frame is W'×H', a size of the image frame appended with the fourth depth maps is $$W' \times \left(H' + \frac{H}{b \times c}\right).$$

10. The method according to claim 1, further comprising:
    receiving, by the client device, the encoded image frame from the remote server;
    obtaining, by the client device, the image frame appended with the fourth depth maps by decoding the encoded image frame;
    constructing, by the client device, the third depth map based on the fourth depth maps;
    generating, by the client device, a visual content based on the image frame and the third depth map.

11. An electronic system comprising a remote server and a client device, wherein the remote server is configured to perform:
    obtaining a first depth map of an image frame, wherein the first depth map comprises a plurality of first depth pixels corresponding to a plurality of image pixels in the image frame;

downscaling the first depth map as a second depth map, wherein the second depth map comprises a plurality of second depth pixels, and each second depth pixel has a depth value;

adjusting the second depth map as a third depth map by scaling up the depth value of each second depth pixel based on a specific ratio;

dividing the third depth map into a plurality of fourth depth maps;

appending the fourth depth maps to the image frame;

encoding the image frame appended with the fourth depth maps; and transmitting the encoded image frame to the client device.

12. The electronic system according to claim 11, wherein before obtaining the first depth map of the image frame, the remote server further performs:

generating the image frame for the client device by rendering a specific part of a visual content.

13. The electronic system according to claim 11, wherein a size of the first depth map is W×H, W is a width of the first depth map, H is a height of the first depth map, and the remote server performs:

downscaling a resolution of the first depth map to $$\frac{W}{a} \times \frac{H}{b},$$

wherein a and b are scaling factors.

14. The electronic system according to claim 11, wherein the depth value of each second depth pixel is a normalized depth value ranged between a lower limit and an upper limit, and the remote server performs:

determining a reference upper limit via multiplying the upper limit with a predetermined factor, wherein the predetermined factor ranges between 0 and 1;

determining the specific ratio based on the predetermined factor; and generating the third depth map by multiplying the depth value of each second depth pixel by the specific ratio.

15. The electronic system according to claim 14, wherein the lower limit is 0.0f and the upper limit is 1.0f, wherein f stands for a floating number.

16. The electronic system according to claim 14, wherein the specific ratio is a reciprocal of the predetermined factor.

17. The electronic system according to claim 11, wherein the third depth map comprises a first region and a second region respectively corresponding to a left-eye frame part and a right-eye frame part of the image frame, each image pixel is characterized as N bits, and the depth value of each second pixel in the third depth map is characterized as N/2 bits.

18. The electronic system according to claim 11, wherein a size of the third depth map is $$\frac{W}{a} \times \frac{H}{b},$$

and a size of each fourth depth map is $$\frac{W}{a} \times \frac{H}{b \times c},$$

wherein a and b are scaling factors, c is a dividing factor.

19. The electronic system according to claim 18, wherein a size of the image frame is W'×H', a size of the image frame appended with the fourth depth maps is $$W' \times \left(H' + \frac{H}{b \times c}\right).$$

20. The electronic system according to claim 11, wherein the client device performs:

receiving the encoded image frame from the remote server;

obtaining the image frame appended with the fourth depth maps by decoding the encoded image frame;

constructing the third depth map based on the fourth depth maps; and generating a visual content based on the image frame and the third depth map.

* * * * *